United States Patent

Martin Neira

[19]

[11] Patent Number: 5,546,087
[45] Date of Patent: Aug. 13, 1996

[54] ALTIMETRY METHOD

[75] Inventor: Manuel Martin Neira, VN Voorhout, Netherlands

[73] Assignee: Agence Spatiale Europeene, Paris, France

[21] Appl. No.: 329,647

[22] Filed: Oct. 25, 1994

[30]   Foreign Application Priority Data

Nov. 5, 1993 [FR] France .................... 93 13192

[51] Int. Cl.⁶ ......................... G01S 5/02
[52] U.S. Cl. ............................. 342/120
[58] Field of Search ............... 342/120, 25, 191, 342/126, 125, 357

[56]   References Cited

U.S. PATENT DOCUMENTS

| | | | |
|---|---|---|---|
| 3,761,813 | 9/1973 | Perrin | 342/356 |
| 4,359,733 | 12/1992 | Brown | 342/191 |
| 5,187,485 | 2/1993 | Tsui, et al. | 342/126 |

FOREIGN PATENT DOCUMENTS

WO87/06335   10/1987   WIPO .

OTHER PUBLICATIONS

Ingarss'89 Remote Sensing: An Economic Tool for the Nineties, vol. 4, 10 Jul. 1989, Vancouver, Canada pp. 2261–2264, XP139378.

H. . Braun, P. Hartl "Bistatic Radar in Space a New Dimension In Imaging Radar".

*Primary Examiner*—Daniel T. Pihulic
*Attorney, Agent, or Firm*—Sughrue, Mion, Zinn, Macpeak & Seas

[57]   ABSTRACT

An altimetry method uses one or more sources of opportunity, for example transmitters on satellites of the "GPS" satellite navigation system. One or more receivers on board an aircraft or a satellite in low Earth orbit are used. Multiple correlation is applied between the direct signal received from the transmitter and the reflected signal. The coordinates of the point of specular reflection are derived from the measured delay achieved by said multiple correlation and comparison with a theoretical model of the terrestrial sphere. The device for implementing the method includes a signal processor, a variable delay circuit, a discrete delay line, a bank of correlators and detectors. A specific application of the method and device is ocean altimetry.

15 Claims, 8 Drawing Sheets

FIG_1

FIG_2

FIG_3

FIG_4

FIG_5a

FIG_5b

FIG_6

FIG_7

FIG_8

FIG_9

FIG_10a

FIG_10b

FIG_10c

FIG_11a

FIG_11b

FIG_12

FIG_13

FIG_14

FIG_17

FIG_15

FIG_16

FIG_18

ALTIMETRY METHOD

BACKGROUND OF THE INVENTION

1. Field of the Invention

The present invention concerns altimetry from the air or from space, especially ocean altimetry.

The invention also concerns a device for implementing the method.

2. Description of the Prior Art

As recognized during the Consultative Meeting on Imaging Altimeter Requirements and Techniques held in June 1990 at the Mullard Space Science Laboratory, the ability to carry out high precision ocean altimetry over a swath with a high spatial resolution would revolutionize many fields of earth science.

There are many methods for carrying out ocean altimetry. The three main parameters associated with these methods and defining their respective performance are: vertical precision, spatial resolution and swath.

Most conventional methods are based on the use of radar emitting signals of suitable wavelength, for example an airborne radar. There are various types of radar: single-pulse system, interferometric system, etc. Altimetry of this type has been mostly limited to nadir-looking type instruments, restricting the range of possibilities.

Some prior art methods used existing radio frequency signals and combine in an airborne or space receiver signals from the transmitter (direct signals) and signals reflected from the ocean (or, more generally, from the terrestrial surface). In the following description the expression "terrestrial surface" refers to the terrestrial crust, or to the surface of oceans, seas or lakes, or to the surface of frozen water.

The following two documents described such methods:

The article by Philipp HARTL and Hans Martin BRAUN: "A Bistatic Parasitical Radar (BIPAR)" published in "INTERNATIONAL ARCHIVES OF PHOTOGRAMMETRY AND REMOTE SENSING", vol 27, 1988, pages 45–53; and the technical report "AIRCRAFT ALTITUDE DETERMINATION USING MULTIPATH INFORMATION IN AN ANGLE-MEASURING NAVIGATION SATELLITE SYSTEM" by David KURJAN, Moore School Report no. 72-12 of 30 Sep. 1971.

Usable existing sources of radio frequency signals, known as "sources of opportunity", include communication and television satellites such as the "GPS" ("Global Positioning Satellite") satellite navigation system used in the West and its equivalent GLONASS in the former Soviet Union.

Whilst retaining the concept briefly mentioned above (use of sources of opportunity and combination of direct and reflected waves), this invention is directed to providing a very high precision altimetry method with a specific application to estimating the height of seas of oceans and variations therein. This invention is also directed to maintaining this precision over large area swaths, the measurements no longer being restricted to the nadir.

To this end, one major feature of the method of the invention is the use of multiple correlation of the direct and reflected signals.

For simplicity, but without any intention of limiting the invention, the remainder of this description concerns signals from "GPS" system satellites and a receiver on a satellite in low earth orbit ("LEO"). The receiver can be an airborne receiver without departing from the scope of the invention.

Also for reasons of simplicity, unless otherwise indicated the remainder of this description concerns only specular reflection. Signals obtained by diffuse reflection can nevertheless be used, especially in sea ice mapping applications.

To be more precise, altimetry is performed by measuring accurately the coordinates of the point of specular reflection by delay measurements and using a geodetic Earth model.

One model that can be used is the WGS-84 ("World Geodetic System 1984) model. A definition of the WGS-84 model can be found in ANON, "Department of Defence World Geodetic 1984—its definition and relationships with local geodetic systems", Defence Mapping Agency Technical Report, No. DMA TR 8350.2, second edition, 1988.

A general description of geodetic systems is given in the article by P.A. CROSS: "Position: Just What Does it Mean!", published in "Proceedings of NAV'89 Conference, Royal Institute of Navigation, London.

Finally, if the transmitter is one of the "GPS" satellites or a source of signals of this type, its instantaneous coordinates and the characteristics of the signals transmitted are accurately known.

Until now it has been implicitly assumed that a single source of signals is used, of example the transmitter of one of the "GPS" system satellites. A plurality of spatially separate sources can advantageously be used. In this case altimetry can be carried out over several subtracks which will be spread over a distance depending on the receiver altitude.

If several receivers are assumed, as in the case of a constellation of small receiving satellites, then the subtrack distance can be determined by adjusting the orbits of the receivers.

The invention also authorizes real time processing of the data using on-board signal processing devices, necessary for implementation of the method, unlike prior art systems (using "SAR" type radars defined below, for example) which use installations on the ground to process the acquired data. This leads to significant delays in availability.

SUMMARY OF THE INVENTION

The invention includes an altimetry method using sources of opportunity, i.e. signals transmitted by at least one transmitter on board a platform in terrestrial orbit with particular characteristics; the method comprising at least a stage of receiving and combining, in a receiver on board a platform in terrestrial orbit with particular specifications or on board an aircraft, signals received direct from said transmitter and signals reflected from the surface of the terrestrial sphere, and a stage of measuring the coordinates of the point of specular reflection of the signals transmitted from the surface of the terrestrial sphere by measuring the propagation delay of the reflected signals, a stage of comparing with a theoretical model of the geometrical properties of the terrestrial sphere, in order to determine variations in altitude of said terrestrial surface relative to said model, and in which method said combination stage, to obtain the echo waveform, entails multiple correlation of the received reflected signal with a particular number of replicas delayed by a constant amount of the received reflected signal, said waveform having an upstream noise floor and a downstream pulse of entirely reflected power amplitude bracketing a median range representing the delay associated with said point of specular reflection.

The invention also includes an altimetry device implementing this method.

The invention will be more clearly understood and other features and advantages of the invention will emerge from a reading of the following description given with reference to the appended drawings.

DETAILED DESCRIPTION OF THE PREFERRED EMBODIMENT

Figure 1:
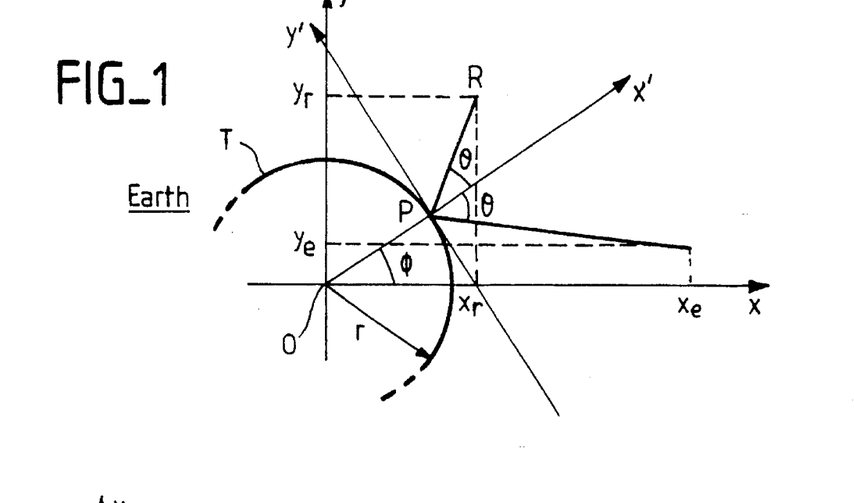
FIGS. 1 and 2 are geometrical constructions used to calculate the position of the point of specular reflection.

As already mentioned, it is first assumed that there is one source of opportunity, i.e. a single transmitter E and a single receiver R. FIG. 1 shows this situation.

One problem to be overcome is that of determining precisely the coordinates of the point $P_S$ of specular reflection on the terrestrial surface T of a wave emitted by the source E and picked up by the receiver R. Initially the Earth is assumed to be a perfect sphere of radius r and center o.

Let xy be reference plane such that the plane xOy contains the transmitter E, the receiver R and a reflection point P. The cartesian coordinates of P can be expressed by the function P (x, y), those of R by the function R (x, y) and those of E by the function E (x, y). The polar coordinates of P are the angle $\phi$ relative to the Ox axis and the terrestrial radius r.

Changing coordinates and choosing a new reference plane x'Oy' such that the axis Ox' is coincident with the line bisecting the angle $R\hat{P}E = 2\times\theta$ and the origin is the point P itself (translation by a distance r), the relationship between xy (the coordinates of a point in the original reference plane) and x'y' (the coordinates of a point in the new reference plane) is then as follows:

$$\begin{bmatrix} x' \\ y' \end{bmatrix} = \begin{bmatrix} \cos\phi & \sin\phi \\ -\sin\phi & \cos\phi \end{bmatrix} \begin{bmatrix} x \\ y \end{bmatrix} - \begin{bmatrix} r \\ 0 \end{bmatrix} \quad (1)$$

The coordinates of the transmitter E and the receiver R are transformed into the new system of reference:

$$\begin{bmatrix} x_e' \\ y_e' \end{bmatrix} = \begin{bmatrix} \cos\phi & \sin\phi \\ -\sin\phi & \cos\phi \end{bmatrix} \begin{bmatrix} x_e \\ y_d \end{bmatrix} - \begin{bmatrix} r \\ 0 \end{bmatrix} \quad (2)$$

$$\begin{bmatrix} x_r' \\ y_r' \end{bmatrix} = \begin{bmatrix} \cos\phi & \sin\phi \\ -\sin\phi & \cos\phi \end{bmatrix} \begin{bmatrix} x_r \\ y_r \end{bmatrix} - \begin{bmatrix} r \\ 0 \end{bmatrix} \quad (3)$$

Because the reflection is specular reflection, the following equation is satisfied:

$$\frac{x_e'}{y_e'} = \frac{x_r'}{y_r'} \quad (4)$$

Carrying out the standard substitutions and the following change of variable:

$$t = \tan \phi/2 \quad (5)$$

the equation of the specular reflection point $P_S$ can be written as (spherical mirror equation):

$$c_4 t^4 + c_3 t^3 + c_2 t^2 + c_1 t + c_0 = 0 \quad (6)$$

where:

$$c_0 = (x_e y_r + y_e x_r) - r(y_e + y_r) \quad (7)$$

$$c_1 = -4(x_e x_r - y_e y_r) + 2r(x_e + x_r) \quad (8)$$

$$c_2 = -6(x_e y_r + y_e x_r) \quad (9)$$

$$c_3 = 4(x_e x_r - y_e y_r) + 2r(x_e + x_r) \quad (10)$$

$$c_4 = (x_e y_r + y_e r_r) + r(y_e + y_r) \quad (11)$$

Figures 2, 3:
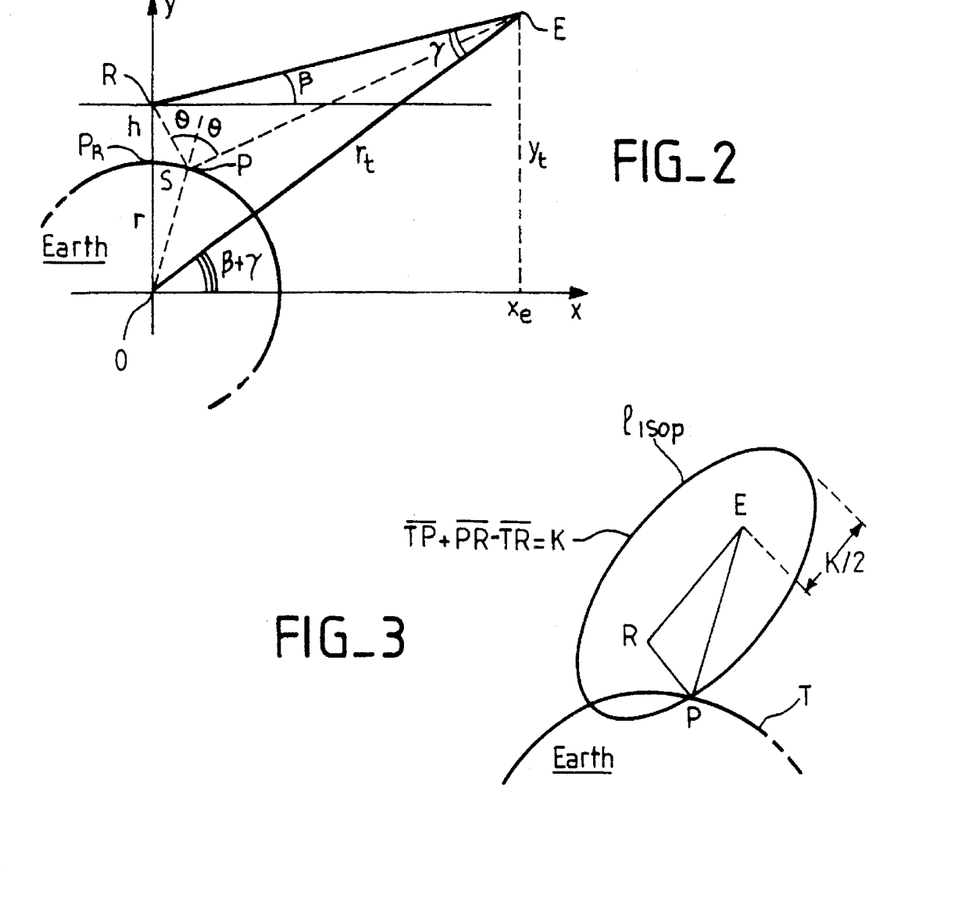
FIGS. 3 and 4 are geometrical constructions used to calculate iso-range lines.

It is also necessary to determine the distance from the receiver R to the point $P_S$ of specular reflection as a function of the elevation of the transmitter E above the local horizon. It is assumed arbitrarily that the receiver R is located along the Oy axis of an orthonomic trihedron yOx at an altitude of h over terrestrial surface T (see FIG. 2). Its coordinates are:

$$x_r = 0 \text{ and } y_r = r + h \quad (12)$$

The coordinates of the transmitter E can be expressed in terms of the elevation angle $\beta$ above the local horizon at the location of the receiver R using the following relations, as directly derived from FIG. 2:

$$x_e = r_e \cos(\beta + \gamma); \quad (13)$$

$$y_e = r_e \sin(\beta + \gamma) \text{ et } \frac{\sin\left(\frac{\pi}{2} + \beta\right)}{r_e} = \frac{\sin(\gamma)}{r + h};$$

where $r_e$ is the orbital radius of the transmitter E and $\gamma$ is the angle $R\hat{E}O$. Conventional manipulation yields the required coordinates:

$$x_e = r_e \cos\beta \sqrt{1 - \frac{(r+h)^2}{r_e^2} \cos^2\beta} - (r+h)\sin\beta\cos\beta \quad (14)$$

$$y_e = r_e \sin\left(\beta \sqrt{1 - \frac{(r+h)^2}{r_e^2} \cos^2(\beta)}\right) + (r+h)\cos^2(\beta) \quad (15)$$

Let $R_2 = \overline{RP0}$ be the distance between the receiver R and the point $P_S$ of specular reflection and S the arc length from the point of projection $P_R$ of the receiver R onto the terrestrial surface T:

$$= (\pi/2 - \phi)r \quad (16)$$

If the transmitter E is one of the "GPS" system satellites, the orbital radius is $r_e = 26.5 \cdot 10^6$ m. The value $r = 637 \cdot 10^6$ m is taken for the Earth radius. Using these values and the above formula, the arc length S and the distance $R_2$ are readily calculated from the elevation $\beta$ of the transmitter E above the local horizon at the position of the receiver R and from h.

For example, consider three values of the altitude h:
a/ h=700 km (low earth orbit satellite);
b/ h=10 km (aircraft); and
c/ h=1 km (low-flying aircraft).

The arc length S and the distances $R_2$ are calculated for variations in the angle $\beta$ between 0° and 90°. The results of these calculations are set out in tables 1 through 3 in APPENDIX 1 to this patent application.

It is necessary to define an additional parameter: the iso-range lines. The iso-range lines are defined as those points for which the relative delay between the direct signal and the reflected signal is the same. This condition can be written, with reference to FIG. 3:

$$\overline{EP} + \overline{PR} - \overline{ER} = K \quad (17)$$

where E is the transmitter point, R the receiver point and P the reflection point for which the path difference is K (in meters if the other distances are expressed in this unit). It is assumed that the propagation time depends essentially on the distance and not on the medium.

It can also be assumed that the positions of the transmitter E and the receiver R are known from the information provided by the transmitted signals themselves and that therefore the distance $\overline{ER}$ is a known constant in the above equation. For this reason the following equivalent expression can be written:

$$\overline{EP} + \overline{PR} = k \quad (18)$$

with k being a constant equal to:

$$k = K + \overline{ER} \quad (19)$$

The above equation is of an ellipsoid of revolution with foci at the transmitter point E and at the receiver point R as depicted in FIG. 3. The intersection of this ellipsoid and the terrestrial surface T defines a particular iso-range line $L_{isoP}$. A family of iso-range lines $L_{iso}$ is generated when k is allowed to take different values.

The instrument of the invention measures the quantity k. A known range processor uses several values of this delay separated by one segment of the transmitted signal ("code chip") to perform range discrimination. The signals transmitted by "GPS" type satellites are not made up of binary words with a regular structure, but rather of pseudo-random bit sequences. In the following description, the expression "code chip" is used for the specific signal just defined. To find the width of the strip on the ground corresponding to this "code chip" it is necessary to know the gradient of k as a function of the point $P_S$ of specular reflection. The equation relating the spatial sensitivity $k_S$ of the instrument and the point $P_S$ is as follows:

$$k_s \equiv \frac{1}{\overline{\nabla k}} = \frac{ds}{dk} \quad (20)$$

where s is the coordinate (arc) measured along a coordinate line perpendicular to the iso-range line.

In general, the intersection of the ellipsoids defined by equation (18) above and the terrestrial surface (modelled also as an ellipsoid of revolution) gives a curve which is not flat.

Consider first the general case where the transmitter E is in any arbitrary direction. The particular case where the transmitter E is in the zenith direction of the receiver R is considered later. For this particular configuration the iso-range lines and the sensitivity are calculated. The Earth with always be approximated by a sphere.

Figure 4:
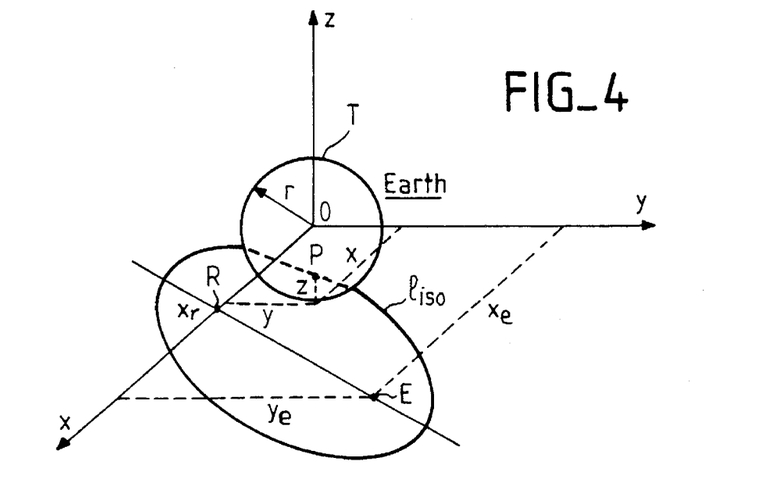

The general case is shown in FIG. 4. For the coordinates an Earth centered coordinate system is chosen such that the receiver R is on the Ox axis and the transmitter E is in the xOy plane. The coordinates of the points E, R and P satisfy the following equations:

$$E = (x_e, y_e, 0); \ R = (x_r, 0, 0); \ P = (x, y, z) \quad (21)$$

The ellipsoid defined by equation (18) can be written as:

$$\sqrt{(x - x_e)^2 + (y - y_e)^2 + z^2} + \sqrt{(x - x_r)^2 + y^2 + z^2} = k \quad (22)$$

and the equation for the terrestrial sphere as:

$$x^2 + y^2 + z^2 = r^2 \quad (23)$$

The iso-range lines $l_{iso}$ are defined by the intersection of the ellipsoids and the terrestrial sphere. When this intersection is calculation the following equation is found for the projection of the iso-range lines $l_{iso}$ onto the xOy plane:

$$ax^2 + by^2 + cxy + dx + ey + f = 0 \quad (24)$$

The coefficients "a" through "f" are easily calculated from the equations (21) through (23).

Consider now the case where the transmitter E is in the zenith direction of the receiver R, that is the case for which $y_e = 0$.

Equation (24) can be rewritten as follows:

$$Ax^2 + Bx + C = 0 \quad (25)$$

with:

$$A = 4(x_e - x_r)^2 \quad (26)$$

$$B = -4(x_e + x_r)[(x_e - x_r)^2 - k^2] \quad (27)$$

$$C = (x_e x_r)^2 (x_e - x_r)^2 - 2k^2(2r^2 + x_e^2 + x_r^2) + k^4 \quad (28)$$

The equations of the iso-range lines $l_{iso}$ are finally obtained:

$$y^2 + z^2 = r^2 - x^2(k) \quad (29)$$

with $$x(k) = \frac{(x_e + x_r)[(x_e - x_r)^2 - k^2] + 2k\sqrt{x_e x_r k^2 - (x_e - x_r)^2(x_e x_r - r^2)}}{2(x_e - x_r)^2} \quad (29a)$$

Figure 5A:
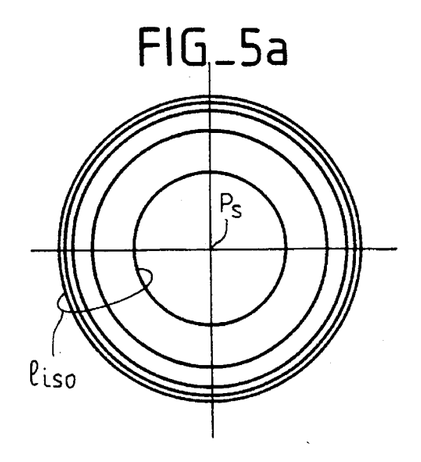
FIGS. 5a and 5b are diagrams showing specific iso-range lines.

The iso-range lines are thus circles parallel to the yOz plane and centered on the Oz axis, as shown in FIG. 5a. The range of values of k extends from a minimum value at the point of projection of the receiver R onto the terrestrial surface T to a maximum value at the point of tangency to the terrestrial sphere. These two limits are given by the following equation:

$$(x_e - x_r) + 2(x_r - r) \leq k \leq \sqrt{x_e^2 + r^2\left(1 - 2\frac{x_e}{x_r}\right)} + \sqrt{x_r^2 - r^2} \quad (30)$$

To compute the spatial sensitivity of the instrument of the invention, equation (28) can be rewritten as follows:

$$k^4 - 2Dk^2 + E = 0 \quad (31)$$

with:

$$D = (x_e - x)^2 + (x_r - x)^2 + 2(r + x)(r - x) \quad (31a)$$

and $$E = [(x_e - x)^2 + (x_r - x)^2]^2 \quad (32)$$

The equation finally obtained for the sensitivity is:

$$k^2(x) = (x_e - x)^2 + (x_r - x)^2 + 2(r + x)(r - x) + 2\sqrt{[(x_e - x)^2 + (r + x)(r - x)][(x_r - x)^2 + (r + x)(r - x)]} \quad (33)$$

The x coordinate is related to the length of the arc s measured from the point of projection of the receiver R onto the terrestrial surface T along any great circle. The value of x then satisfies the following equation:

$$x = r \cos(s/r) \quad (34)$$

Equation (33) above can be rewritten in the following manner as a function of s:

$$k^2(s) = x_e^2 + x_r^2 + 2r(x_e + x_r)\cos\frac{s}{r} + 2r^2 + 2\sqrt{\left(x_e^2 - 2x_r r\cos\frac{s}{r} + r^2\right)\left(x_r^2 - 2x_r r\cos\frac{s}{r} + r^2\right)} \quad (35)$$

The arc length coordinate lines are perpendicular to the iso-range lines. The spatial sensitivity of the instrument is therefore given by the following equation, after differentiating equation (35):

$$k_s \equiv \frac{1}{\nabla k} = \frac{\sqrt{N(s)}}{D(s)} \quad (36)$$

with $$N(s) = x_e^2 + x_r^2 - 2r(x_e + x_r)\cos\frac{s}{r} + 2r^2 + 2\sqrt{\left(x_e^2 - 2x_e r\cos\frac{s}{r} + r^2\right)\left(x_r^2 - 2x_r r\cos\frac{s}{r} + r^2\right)} \quad (37)$$

, and $$D(s) = \sin\frac{s}{r}\left[(x_e + x_r) + \frac{x_e\left(x_r^2 - 2x_r r\cos\frac{s}{r} + r^2\right) + x_r\left(x_e^2 - 2x_e r\cos\frac{s}{r} + r^2\right)}{\sqrt{\left(x_e^2 - 2x_e r\cos\frac{s}{r} + r^2\right)\left(x_r^2 - 2x_r r\cos\frac{s}{r} + r^2\right)}}\right] \quad (38)$$

The arc length s extends from the point of projection of the receiver E onto the terrestrial surface T to the point of tangency. The limits of this arc length can easily be calculated from the following relation:

$$0 \leq s \leq \gamma arc \cos \gamma/x_e \quad (39)$$

The spatial sensitivity of the instrument has been calculated for various arc lengths in the case of a low earth orbit satellite. The results are shown in the table below, along with the spatial resolution obtained using a "GPS" system satellite and the C/A and P codes, respectively.

| s (km) | ks = ds/dk (m/m) | ρg C/A (m) | ρg P (m) |
| --- | --- | --- | --- |
| 0 | ∞ | ∞ | ∞ |
| 10 | 62 | 18600 | 1960 |
| 100 | 6 | 1800 | 180 |
| 200 | 3.2 | 960 | 96 |
| 500 | 1.4 | 420 | 42 |
| 800 | 1.1 | 330 | 33 |
| 1100 | 0.9 | 270 | 27 |
| 3030 | 0.6 | 180 | 18 |

This table shows clearly that the sensitivity is better for longer distances from the receiver R to the target. The best sensitivity is obtained at the point of tangency, and is about 0.6. Near the sub-receiver point the sensitivity is very poor ($k_s$ tends to infinity). For ranges corresponding to arc lengths s greater than approximately 200 km the sensitivity is better than 3.

Detailed consideration has just been given to the specific case in which the transmitter E is at the zenith of the receiver R. The point $P_S$ of specular reflection coincides with the projection of the transmitter E onto the terrestrial surface. The iso-range lines $l_{iso}$ are circular and concentric with the point $P_S$ of specular reflection.

Figure 5B:
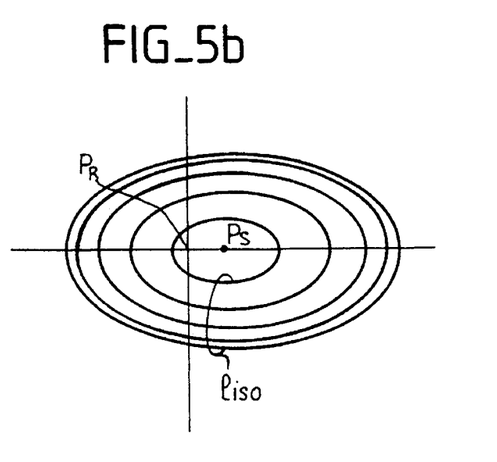

When the transmitter E is at an elevation other than zenith, the specular reflection point is on the terrestrial surface between the receiver R and the transmitter. In this case the iso-range l-iso will also be concentric around the point $P_S$ of specular reflection but will be ellipses. The separation between them decreases in the direction away from the point $P_S$. This configuration is shown in FIG. 5b.

The point $P_S$ of specular reflection is disposed away from the point $P_R$ of projection of the receiver R onto the terrestrial surface and towards the transmitter E (on the right of the figure in the example shown).

Another phenomenon has to be taken into account: the Doppler effect. The transmitter R moves in space at a particular speed, which gives rise to the Doppler effect. The iso-Doppler lines can be determined in a similar manner to the iso-range lines.

Figure 6:
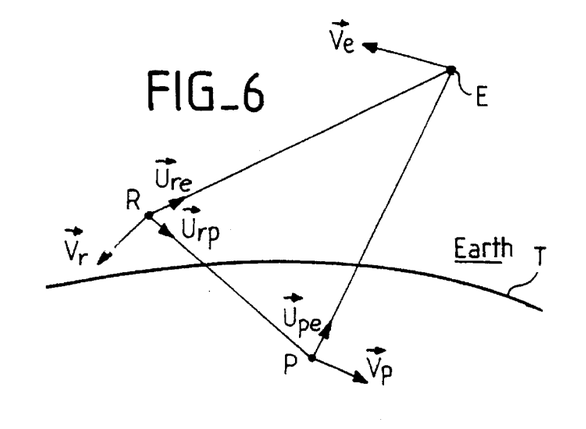
FIGS. 6 and 7 are geometrical constructions used to calculate iso-Doppler lines.
Figure 7:
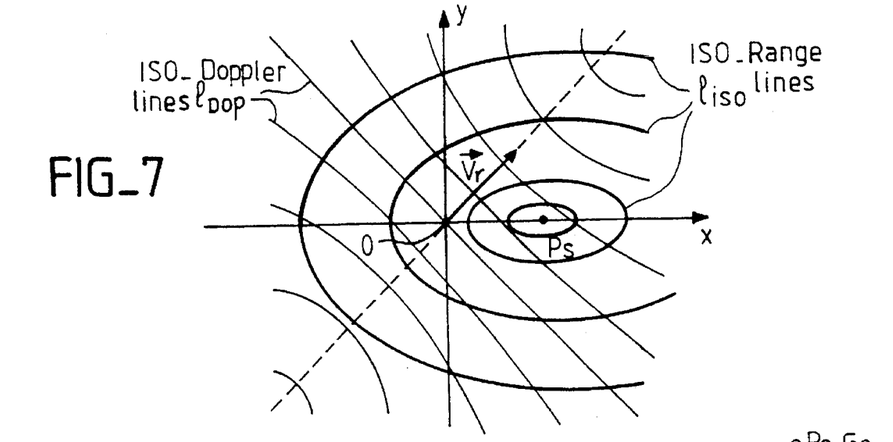

Refer now to FIGS. 6 and 7.

From the FIG. 6 vector diagram, the relative radial velocity for the signal received through the direct path is:

$$v_1(\bar{v}_r - \bar{v}_c)\bar{u}_{re} \tag{40}$$

where:

$v_1$ is the modulus of the radial velocity between the transmitter E and the receiver R along the direct path;

$\bar{v}_c$ is the velocity vector of the transmitter E;

$\bar{v}_r$ is the velocity vector of the receiver R;

$\bar{u}_{re}$ is the unit vector pointing from the receiver R towards the transmitter; and a dot (.) indicates the scalar product of vectors.

The sign has been chosen such that a positive radial velocity means that the transmitter E and the receiver R are moving towards each other.

Likewise, the receiver radial velocity for the signal received through the reflected (indirect) path is:

$$v_2 = (\bar{v}_r - \bar{v}_P).\bar{u}_{rP} + (\bar{v}_P - \bar{v}_e).\bar{u}_{P6} \tag{41}$$

where:

$V_2$ is the modulus of the radial velocity between the transmitter E and the receiver R along the reflected (indirect) path;

$\bar{v}_P$ is the velocity vector of the target;

$\bar{v}_{rP}$ is the unit vector pointing from the receiver R towards the target; and $\bar{u}_{pe}$ is the unit vector pointing from the target towards the transmitter E.

The difference in radial velocity between the direct and reflected (indirect) paths is given by the equation:

$$\lambda f_D = v_2 - v_1 \tag{42}$$

whence $$\lambda f_D = (\bar{v}_r - \bar{v}_P).\bar{u}_{rP} + (\bar{v}_p - \bar{v}_e).\bar{u}_{Pe} - (\bar{v}_r - \bar{v}_e).\bar{u}_{re} \tag{43}$$

This expression can be simplified by assuming that the distance between the receiver R and the target is negligible in comparison with that between the transmitter E and the receiver R or the target, whence:

$$\bar{u}_{re} = \bar{u}_{Pe} \tag{44}$$

In this case, the above equation (43) can be written:

$$\lambda f_D = (\bar{v}_r - \bar{v}_P).\bar{u}_{rP} (\bar{v}_P - \bar{v}_r).\bar{u}_{re} \tag{45}$$

The first term in the righthand part of this equation is similar to that encountered in slant SAR (Synthetic Aperture Radar), except for a factor of 2 due to the monostatic mode of operation. The second term depends only on the velocity $\bar{v}_P$ of the target. As the target velocity is due to the rotation of the Earth which is the same for all points in the footprint, to a first approximation, it can be considered that the second term is a known constant over the antenna footprint of the receiver R.

If the rotation of the Earth is neglected, i.e. if $\bar{v}_P = \bar{0}$, then equation (45) becomes:

$$\lambda f_D = \bar{v}_r.\bar{u}_{rP} - \bar{v}_r.\bar{u}_{re} \tag{46}$$

As the second term on the righthand side is assumed to be a known constant, the iso-Doppler lines are contained in the following family of cones:

$$\bar{v}_r.\bar{u}_{rP} = k_D \tag{47}$$

where:

$$k_D = \lambda f_D + \bar{v}_r.\bar{u}_{re} \tag{48}$$

Intersection of these cones and the terrestrial surfaces gives the iso-Doppler lines $l_{Dop}$. If the terrestrial surface is locally approximately by a plane, the well known family of hyperbolic lines used in conventional slant SAR is obtained, as shown in FIG. 7. Note, however, that although the pattern is the same, the value of the Doppler frequency for each curve will have a constant difference with respect to the usual SAR situation.

The conclusion is that, to a first approximation, the pattern of iso-Doppler lines $l_{Dop}$ is the same as the similar curves obtained for slant SAR. The small difference is explained by the radial dispersion of velocities over the footprint relative to the transmitter, which is estimated to be in the order of 50 m/s for points 400 km apart.

A further difference with respect to monostatic slant SAR is that the families of iso-range and iso-Doppler curves can be oriented in different directions, depending mainly on the direction of the transmitter E and the velocity of the receiver R. This is illustrated in FIG. 7 where the transmitter E is assumed to be located along the Ox axis while the receiver R is moving in a direction 45° away from this axis. The iso-range lines appear oriented towards the transmitter E while the iso-Doppler lines are oriented along the direction of motion of the receiver R.

A final parameter has to be taken into account: it is the "signal to noise" ratio $SNR_0$. The following multistatic radar equation for a distributed target, familiar to the person skilled in the art and therefore needing no detailed description, is used for this. With reference to the power of the source, a transmitter E on a "GPS" system satellite is used. The general equation for single-pulse multistatic radar is:

$$SNR_0 = \frac{1}{2} \left( \frac{P_e G_e}{4\pi R_1^2} \right) \sigma_b A \left( \frac{1}{4\pi R_2^2} \right) \left( \frac{\lambda 2}{4\pi} G_r \right) \left( \frac{1}{K_B T_s B} \right) \tag{49}$$

where:

$SNR_0$ is the signal to noise ratio, for a single pulse;

$P_e$ is the transmitted power (by the "GPS" satellite, for example):

$G_e$ is the antenna gain of the transmitter E;

$R_1$ is the means distance from the transmitter E (the "GPS" satellite) to the receiver antenna footprint of the receiver R on the terrestrial surface;

$\sigma_b$ is the mean normalized bistatic radar cross-section across the receiver antenna footprint, evaluated at the directions of the transmitter E and the receiver R;

A is the area of the receiver antenna footprint on the terrestrial sphere;

$R_2$ is the mean distance from the receiver R to the footprint of the transmitter E on the terrestrial surface;

$\lambda$ is the wavelength used;

$G_r$ is the antenna gain of the receiver R;

$K_B$ is Boltzmann's constant;

$T_s$ is the system temperature, including thermal noise from the scene and receiver noise; and B is the bandwidth of the signal.

Figure 8:
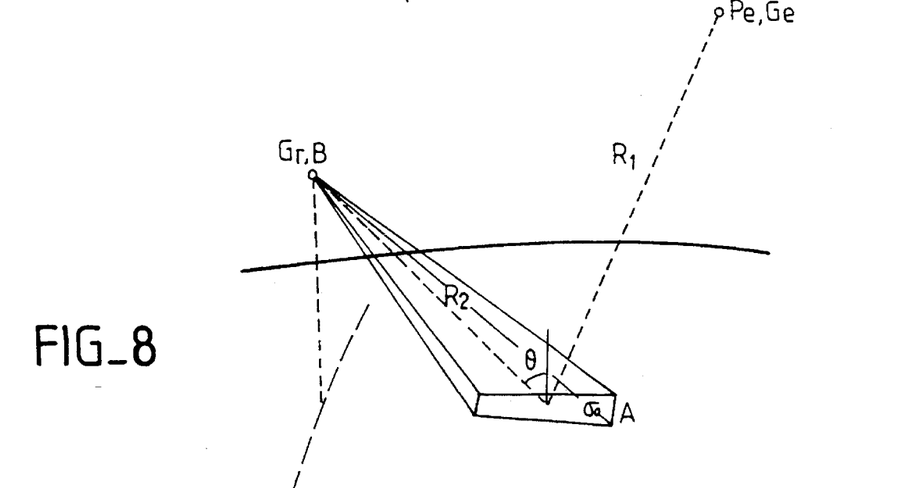
FIG. 8 is a diagram showing various parameters associated with the multistatic radar equation for a distributed target.

These various parameters are shown in FIG. 8.

The system temperature $T_S$ includes the temperature $T_a$ of the antenna of the receiver R due to thermal noise received from the observed scene and also the equivalent temperature $T_{eqr}$ due to noise generated by the receiver R itself. The equivalent temperature $T_{eqr}$ of the receiver R can be expressed in terms of the noise figure F of the receiver, by the following equation:

$$T_{eqr} = (F-1)T_0 \tag{50}$$

where $T_0 = 290°$ K.

Various conventional approximations can be applied, in particular allowing for temperatures usually encountered in this kind of application and because this is a "pulse limited" system. The dimensions of the footprint are very small compared to the distances between the target and the transmitter E or the receiver R. Under these conditions, the normalized bistatic radar cross-section averaged over the antenna footprint of the receiver R can be written as:

$$\sigma_b = a/A \sigma_0(0) \tag{50a}$$

where $\sigma_0(0)$ is equal to the normalized monostatic radar cross-section $\sigma_0$ at ° incidence and the "signal to noise ratio" satisfies the simplified equation:

$$SNR = \left( \frac{S_i/4\pi\cos\theta}{2K_B T_a \lambda^2} \right) \left( \frac{a}{A} \right) \sigma_0(0) \left( \frac{1}{F} \right) \text{ where } S_i = \frac{P_e G_e}{4\pi R_1^2} \tag{51}$$

In accordance with one aspect of the invention the reflected signal is correlated with the direct signal in order to perform the altimetry measurement. Each correlation is carried out over the duration of N "code chips". As the correlation process is performed coherently an improvement is achieved over the single-pulse "signal to noise ratio". The expression for the "signal to noise ratio" therefore becomes:

$$SNR_N = SNR_0 \times N \tag{52}$$

where $SNR_0$ is the "signal to noise ratio" for one pulse and N is the number of pulses.

Figure 9:
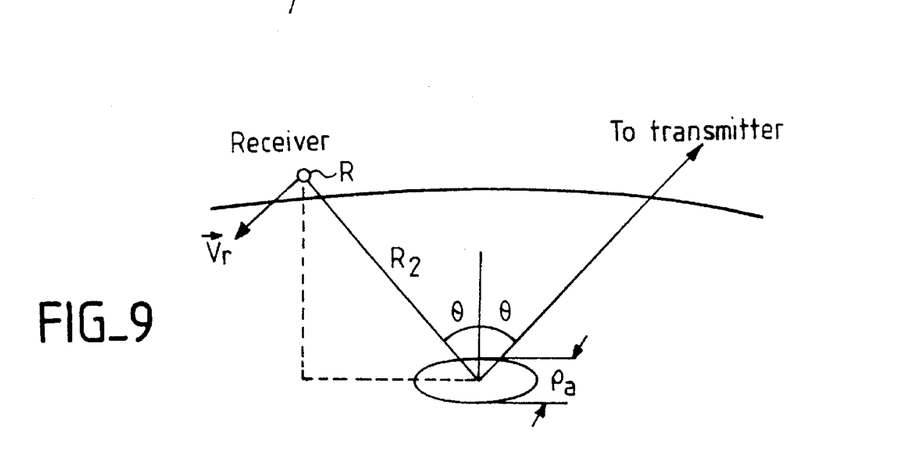
FIG. 9 is a geometrical construction used to calculate the coherence time and the associated number of pulses for determining the "signal to noise ratio".

FIG. 9 shows the motion at the velocity $\bar{v}$ of the receiver R relative to the target, the latter being the pulse limited footprint of the area a.

By applying various standard approximations, and in particular by neglecting in the ocean altimetry application the speed at which the surface of the ocean moves relative to the transmitter, the number of pulses which can be added coherently is given by the following equation:

$$N = \frac{\lambda R_2 B}{4 v \rho_a} \tag{53}$$

in which $\rho_a$ is the length of the pulse limited footprint along the half-mirror axis and $R_2$ is the distance from the receiver R to the target.

The coherence time is given by the following equation:

$$T_c = \frac{\lambda R_2}{2 v \rho_a} \tag{53a}$$

By way of example, table 4 in APPENDIX 2 at the end of this patent application sets out the results obtained in the case of a "GPS" system satellite for codes transmitted in "C/A" and "P" modes by the transmitters of these satellites. The receiver R is a satellite in low earth orbit ("LEO") at an altitude of 700 km. The "chip rate" is 1 MHz for "C/A" ("Coarse Acquisition") pseudo-random codes or 10 MHz for "P" ("precision") codes. The values given in the table are given by way of example only and are in no way limiting on the scope of the invention.

Having now explained the data to be determined in the context of the invention, a detailed description will be given of the features specific to the method of the invention.

Figure 10A:
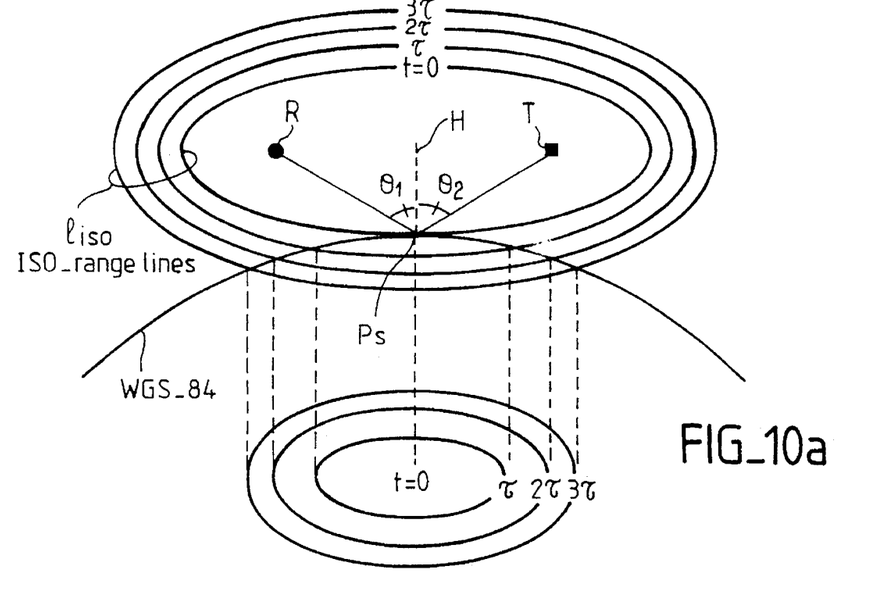
FIGS. 10a through 10c show stages of the method of the invention for calculating the coordinates of the specular reflection point from the time-delays determined.

As already mentioned, the iso-range lines $l_{iso}$ are defined by the intersection of an ellipsoid whose foci are the receiver R and the transmitter with the ellipsoid of the terrestrial sphere T. In the context of the present invention, a model is chosen to represent this ellipsoid. The WGS-84 model referred to in the preamble to the description is preferably chosen. To simplify the following description only this model is referred to. However, other models can be used. FIG. 10a illustrates the WGS-84 ellipsoid and several iso-range lines: t=0, $\tau$, $\tau 2$, $\tau 3$. Considering a specific "code chip", the first echo of the same "code Ship" received after reflection at the ocean surface (more generally at the surface of the terrestrial sphere) corresponds to the delay associated with the ellipsoid tangential to the terrestrial surface. This is due to a geometrical property of ellopsoids whereby for any paid of straight lines starting from any point P on the ellipsoid and each passing through one focus (E and R), the angles $\theta 1$ and $\theta 2$ between these lines and the normal H at the point P are equal: $\theta 1 = \theta 2 = \theta$. This property could be summarized as follows: at the point $P_S$ of specular reflection the normals to the iso-range ellipsoid and to the ellipsoid representing the terrestrial sphere are coincident.

In the preferred application of the invention, to ocean altimetry, the first echo of this same "code chip" will be due to reflection from the wave crests. As the delay is increased more reflecting surfaces will contribute to the signal received, up to a point at which the last edge of the "code chip" reaches a wave trough. Beyond this point the area illuminated by the "code chip" remains about the same and the amplitude will decrease only because of the shape of the antenna pattern, if it is narrow enough, or because of the cross-section of the radar beam with the angle of incidence increasing. This takes into account the theory of bistatic radar.

The average shape of the resulting waveform is given by the convolution of the response at the target point of the system, the ocean surface height distribution and the calm sea impulse response. The antenna footprint is usually much larger then the "pulse limited" footprint.

Figure 10B:
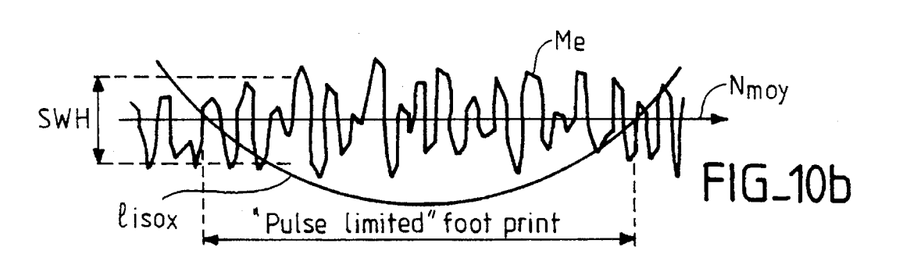
Figure 10C:
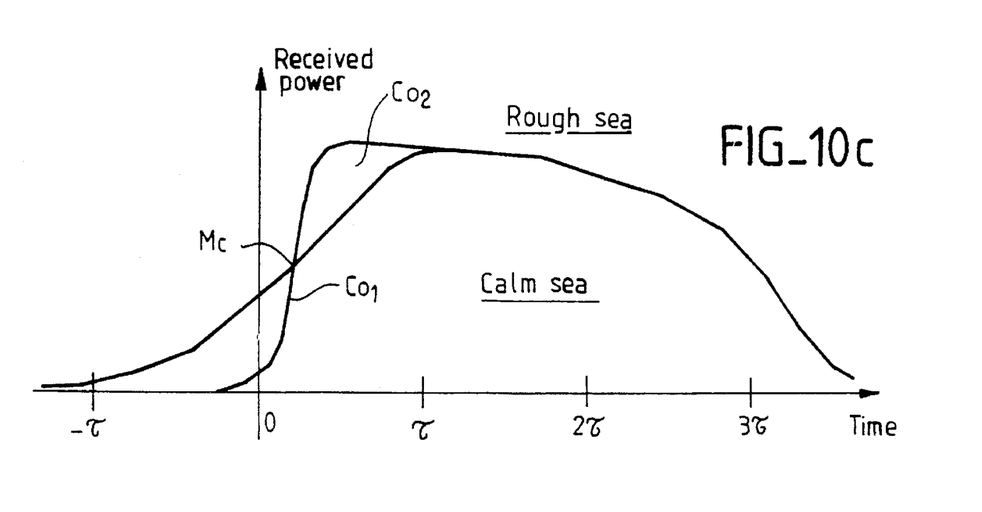

The illuminated areas for various "code chips" and the average shape of the received waveform are shown in FIGS. 10b and 10c. In FIG. 10b the curve $M_e$ represents a rough sea and the curve $N_{moy}$ a calm sea (mean sea level). The curve $l_{isox}$ is one of the iso-range lines from FIG. 10a. It is easily understood that when the sea is calm, before time t=0, the reflected signal has a theoretically null amplitude, and in reality a very low amplitude, as shown in FIG. 10c; curve $Co_1$. This is obviously not so for a rough sea (FIG. 10c: curve $Co_2$). Depending on the SWH ("Significant Wave Height" value, signals are reflected before time t=0: curve $Co_2$. As also shown in FIG. 10c, the mid-point $M_C$ of the rising edges of the curves $Co_1$ and $Co_2$ of the received waves does not depend on the SWH value, but is strongly influenced by the mean sea level $N_{moy}$. This point corresponds to the point $P_S$ of specular reflection, i.e. a point on the surface of the earth. The rising edge of the curve $Co_1$ is very low compared to τ.

Altimetry, and in particular ocean altimetry, is carried out in accordance with the invention by deducing from the determined propagation delays of direct and reflected waves the coordinates of the specular reflection point relative to the position of the receiver R on the ellipsoid representing the terrestrial sphere. The reference coordinate system is a fixed coordinate system centered on a model defining the terrestrial sphere, in a preferred embodiment the WGS-84 model. The receiver R to terrestrial sphere T vectors derive from measurements carried out when the receiver R (a low Earth orbit satellite, for example) moves along its orbit are used to construct a curved rigid line which, when the orbit of the receiver R has been precisely determined in the same system of reference (the WGS-84 model, for example), is used to acquire the height of the surface of the seam (or, more generally, of the terrestrial surface) relative to the reference (WGS-84) ellipsoid.

Figures 11A, 11B:
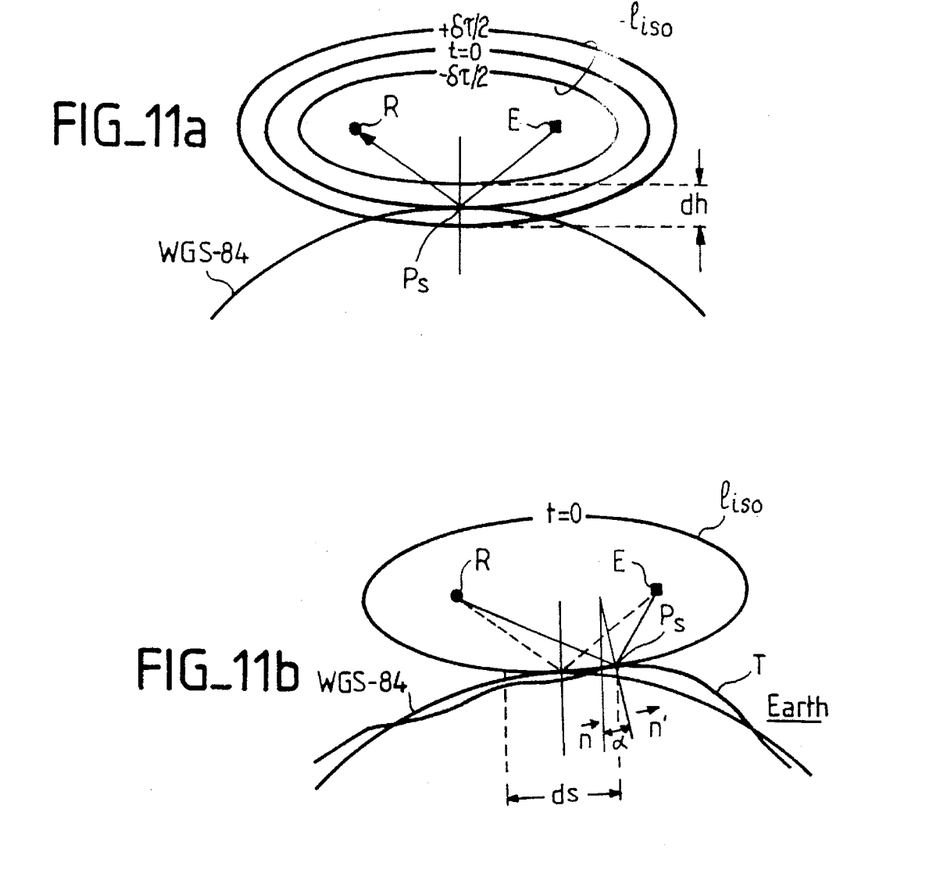
FIGS. 11a and 11b are geometrical constructions showing two sources of altimetry error.

There are basically two sources of errors in the determination of the relative coordinates between the receiver R and the point of specular reflection. The first, shown in FIG. 11a, is due to the uncertainty dτ in the measurement of the delay corresponding to the half power point of the rising edge of the received waveform (FIG. 10c). This gives a possible range of values dh of altitude along the normal to the terrestrial ellipsoid and between two iso-range ellipsoids +dτ/2 and −dτ/2 for the point $P_S$ of specular reflection.

The second source of error, shown in FIG. 11b, is due to the so-called "normal deviation". The normal deviation at a point $P_S$ on the actual terrestrial surface T is the angular difference α between the normal $\bar{n}'$ to this surface and the normal $\bar{n}$ to the reference (WGS-84) ellipsoid. Because of this difference, which is assumed to be unknown, there is an uncertainty ds in the location of the point $P_S$ of specular reflection. However, as shown below, the contribution of the normal deviation to the vertical error is negligible.

Consider the case of a "GPS" satellite again, by way of non-limiting example. Table 5 in APPENDIX 3 of this description sets out the values of the pulse limited footprint dimensions as a function of the elevation angle β for the two types of codes previously mentioned: "C/A" and "P", and the arc values. The footprint has an elliptical shape with its greatest dimension in the plane of incidence. The dimensions have been calculated for a receiver R on board a low Earth orbit ("LEO") satellite altitude 700 km.

Figure 12:
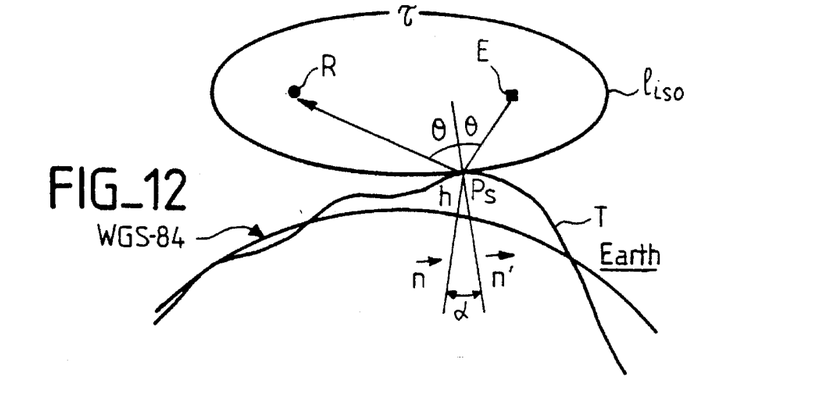
FIGS. 12 to 14 are geometrical constructions used to calculate the vertical precision of altimetry.

Referring now to FIG. 12, the point $P_S$ of specular reflection can be located on the surface of the terrestrial sphere by three coordinates: the relative time-delay τ between the reflected signal and the direct signal and the two angles $α_1$ and $α_2$ defining the normal deviation. In FIG. 2 only one of the two angles α, that in the plane of incidence, is shown, for simplicity. The first coordinate τ is measured by the altimeter and fixes and ellipsoid $l_{iso}$ in space. The α coordinates are given by the topography of the surface of the terrestrial sphere, for example the surface of the ocean in the intended application. They define a single point at which the ellipsoid $l_{iso}$ and the surface of the earth are tangential. This is the characteristic associated with the point $P_S$ of specular reflection. The altitude of the terrestrial surface relative to the reference (WGS-84) ellipsoid at the point of specular reflection can therefore be written as a function of τ, $α_1$ and $α_2$:

$$dh = \frac{\partial h}{\partial \tau} d\tau + \frac{\partial h}{\partial \alpha_1} da_1 + \frac{\partial h}{\partial \alpha_2} da_2 \quad (54)$$

In the following description it is assumed that the altimeter processes the direct and reflected signals in such a way that the delay corresponding to the point $P_S$ of specular reflection is measured with the precision given by dτ. The point $P_S$ of specular reflection is a point on the terrestrial sphere corresponding to the mean sea level and the associated delay is determined by the half power point of the rising edge of the received signal (FIG. 10c).

The angles α depend directly on the shape of the terrestrial sphere relative to the reference (WGS-84) ellipsoid. The value of the normal deviation over the ocean is very small, in the order of dα=$10^{-5}$ radians or even less. For this reason its effect on the vertical accuracy can be ignored.

Figure 13:
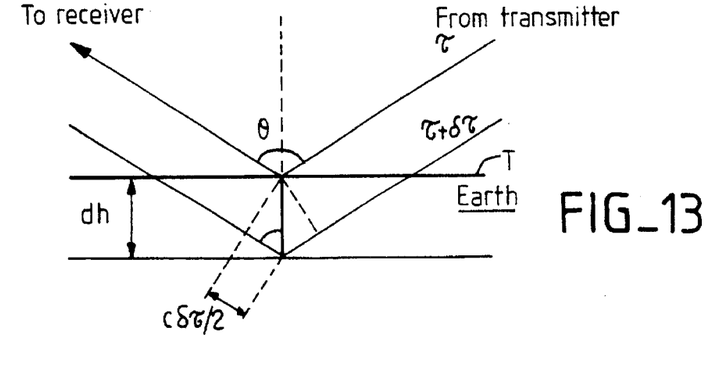

The partial derivatives of equation (56) above are calculated next. For the calculation of $$dh = \frac{-cd\tau}{2\cos\theta},$$

see FIG. 13. The following equation can be written directly:

$$\frac{\partial h}{\partial \tau} = \frac{-c}{2\cos\theta} \quad (55)$$

where the θ is the angle of incidence and c is the speed of light.

Figure 14:
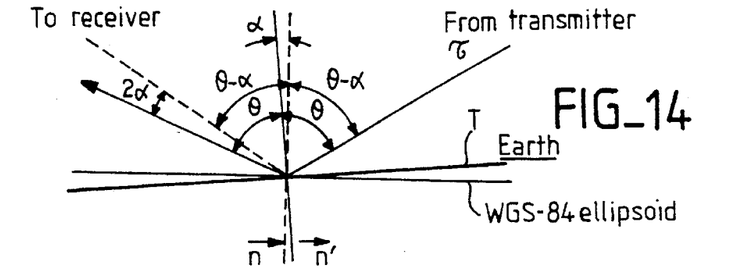

For the computation of $$\frac{\partial h}{\partial \alpha_1} \text{ and } \frac{\partial h}{\partial \alpha_2}$$

see FIG. 14. The following equations can be deduced from this figure:

$$\frac{\partial h}{\partial a_1} = \frac{2R_2\alpha_1}{\cos\theta} \quad (56)$$

and $$\frac{\partial h}{\partial a_2} = 2R_2 a_2 \quad (57)$$

By combining equations (55) through 57):

$$dh = \frac{-cdt}{2\cos\theta} + \frac{2R_2 a_1^2}{\cos\theta} + 2R_2 a_2^2 \quad (58)$$

Because the very small angles α are squared in this expression, their contribution can be ignored and therefore the vertical accuracy can finally be approximated by the formula:

$$dh = \frac{-cdt}{2\cos\theta} \quad (59)$$

For calculating numerical values from this equation it is necessary to know the precision of the time-delay measurement inherent to the altimeter. For this purpose it is possible to extrapolate the precision obtained by the NASA altimeter for the Topex/Poseidon project. This altimeter is capable of a precision of 4 cm in measuring time-delays using a 320 MHz bandwidth pulsed chirp signal.

If a transmitter of the "GPS" system is used, for "P" (precision) type codes with a bandwidth of 10 MHz, and allowing for the ratio of the bandwidths, the achievable precision is:

$$|cdt| = \frac{320}{10} \cdot 4 = 128 \text{ cm} \quad (60)$$

For example, the vertical precision of the altimeter can be calculated for a receiver R on a satellite in low earth orbit ("LEO"): altitude 700 km, as a function of the elevation angle of the transmitter ("GPS") satellite. These values are set out in table 6 in APPENDIX 3 at the end of this description.

Figure 15:
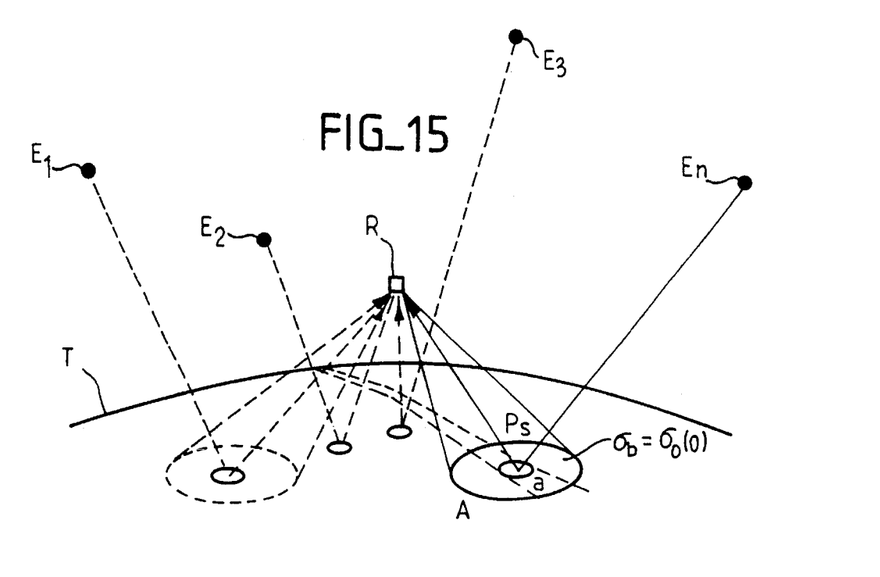
FIG. 15 is a diagram showing the use of a plurality of transmitters.

As mentioned already, a plurality of signal transmitters $E_1$ through $E_n$ can by used. In this case there is a different point $P_S$ of specular reflection for each transmitter above the local horizon of the receiver R, as shown in FIG. 15. In general, the power available from the signals transmitted is relatively low and it follows that the down-looking antenna of the receiver R must have good directivity to achieve the required "signal to noise ratio". The size of the antenna is critical and depends directly on the power level of the signals used.

The normalized monostatic radar cross-section $\sigma_0$, $\rho_b = \rho_0$ (0) at the terrestrial surface T (ocean surface) is large at nadir but decreases rapidly with increasing angle of incidence. The rate of change of this cross-section depends also on the significant wave height parameter previously defined and the wind speed. However, as already mentioned, the instrument operates in pulse limited mode for which the footprint is so small that variations in the radar cross-section with angle of incidence can be ignored. Applying bistatic radar theory. It has already been shown that the normalized bistatic radar cross-section in the case of specular reflection is exactly the same as the normalized monostatic radar cross-section at nadir: $\rho_b = \rho_0$ (0). As shown in FIG. 15, every pulse limited signal footprint, regardless of the transmitter $E_1$ through $E_n$, has a large normalized cross-section for the receiver R.

Depending on the directivity of the antenna of the receiver R, the antenna footprint may enclose only one footprint of the pulse limited signal and the beam then has to be pointed to each specular reflection point in turn, as shown in FIG. 15. In this case the antenna of the receiver R is advantageously of the "phased array" so that the beam can be swept over an area of the ocean surface sufficient to enclose all points of specular reflection. At a given time the cone of the beam intercepts an area A of beam enclosing the area $\alpha$ of the footprint of a pulse limited signal.

In the case of a receiver R on a low Earth orbit ("LEO") satellite at 700 km altitude and transmitters of "GPS" system satellites, all specular reflection points at an elevation angle exceeding 40° correspond to off-nadir angles less than 40°. In this case the antenna of the receiver R must be designed so that the direction of the receive diagram, which points down, can be steered within a cone with a half-angle of 40° and its axis parallel to nadir.

The receiver R must also be provided with an up-pointing second antenna to receive the signals direct from the transmitter(s). These signals are used as reference signals in processing of the reflected signals. They provide the response which would be measured by the down-looking antenna from the target point. For this reason the reflected signals are processed by correlating them with the direct signal.

The altimeter device for implementing the method of the invention and the more specific features of the method are now described with reference to FIGS. 16 through 18.

Figure 16:
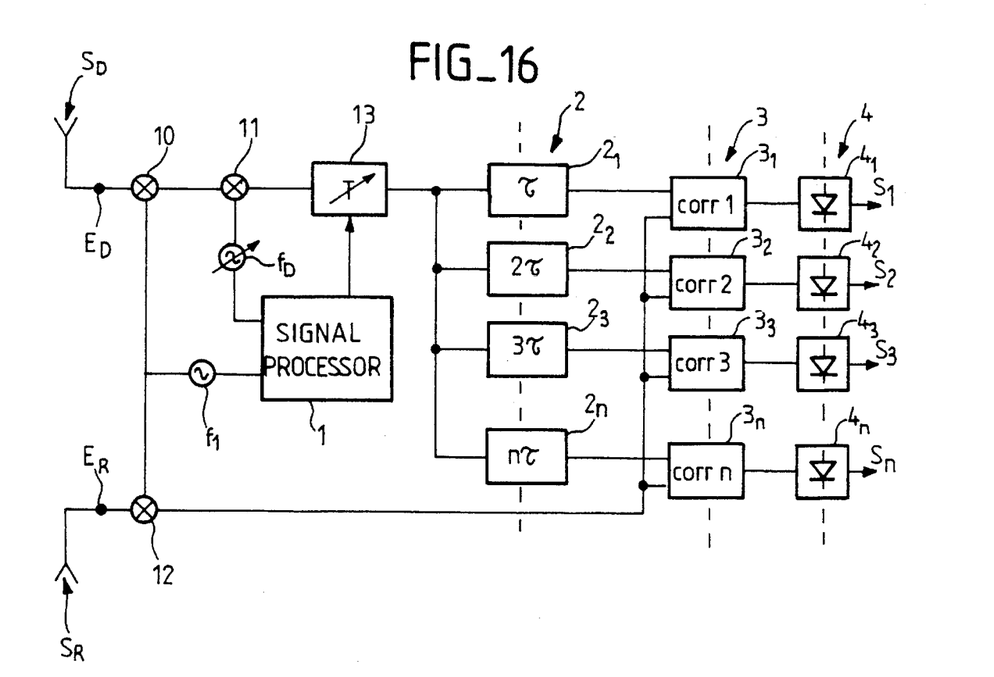
FIG. 16 is a block diagram of one embodiment of a device for implementing the method of the invention.

FIG. 16 shows an altimeter device of the invention. The direct signal $S_D$ and reflected signal $S_R$ enter at respective inputs $E_D$ and $E_R$. The transmitters are assumed to transmit signals modulated with a pseudo-random code, which is actually the case for transmitters of the "GPS" system satellites. The device of the invention includes a known type signal processor 1. This can calculate the foreseeable Doppler frequency of the reflected signal from the positions and velocities of the receiver R and the transmitted E (one specific transmitter if several transmitters are used, as in FIG. 15) received at a particular time. It is assumed that these parameters (position and speed) are either known or can be calculated conventionally. In the conventional way, the direct signal $S_D$ is first transposed to as lower frequency by a fixed frequency first control down converter 10, under the control of the signal processor 1 which supplies a first frequency $f_1$. The transposed signal is then shifted in frequency using the Doppler frequency $f_D$ calculated by the signal processor 1 to obtain the same frequency shift as that affecting the reflected signal $S_R$. The frequency of the latter is also converted by a down converter 12 driven by the aforementioned frequency $f_1$. As mentioned already, the signal processor 1 also determines an approximate value of the relative delay between the direct signal $S_D$ and the reflected signal $S_R$ from the point of specular reflection. The direct signal $S_D$ after its frequency has been down converted and shifted is then delayed by this amount (13), with the exception n/2 "code chips", where n is the number of segments defining the delay variation within which the mean sea level is estimated. This estimate is obtained with reference to the chosen terrestrial model, for example the "WGS-84" model in the preferred embodiment of the invention. This replica of the direct signal is then passed through a discrete delay line 2 with n output to a series of first inputs of a bank 3 of n correlators $3_1$ through $3_n$. The second inputs receive the reflected signal, the frequency of which has been down converted by the converter 12 but which has not undergone any other processing. Each element $2_1$ through $2_n$ of the discrete delay line 2 delays the transmitted signal by the same amount $\tau$, with the result that the signal at the output of the nth correlator $3_n$ is delayed by $n\rho$. Each correlator $3_1$ through $3_n$ correlates a delayed replica of the direct signal with the undelayed reflected signal. The delay is between $\rho$ and $n\rho$, depending on the stage in question of the discrete delay line 2. As there are n correlators, connected to n outputs of the delay line, correlation to n different time positions is obtained. The output of each correlator is detected by the detectors $4_1$ through $4_n$ of the detector circuits 4 to generate samples of the received wave power, as shown in FIG. 10c. Each of these samples can be interpreted as a quantity of power reflected by the ocean surface at a given range relative to the direct signal.

The reflected samples may be contaminated by thermal noise and speckle, with speckle being the dominant source of noise if the system has been properly designed with respect to the "signal to noise ratio". Speckle can be caused by the different rate of change of the phase of the components of the reflected signal corresponding to different portions of ocean surface. Assuming a random distribution of the phase of the different components and following the central limit theorem, the amplitude of the output signal of each correlator will have a gaussian distribution. The distribution of the power of the output signal will be a negative exponential distribution. The mean value of the power will therefore be the same as its standard deviation, and time averaging over a number of samples will be necessary to improve the estimation of the mean power. A rough estimation of the averaging time is 10% of the pulse limited footprint, which leads normally to a number of samples greater than 50, although a larger time interval could also be used to ensure independence between samples.

In the previously mentioned scenario of a receiver R on board a low earth orbit ("LEO") satellite at 700 km altitude and one or more "GPS" system satellite transmitters, 10 % of the pulse limited footprint corresponds to about 1.5 km or 0.2 seconds at orbital speed, which is 143 times the coherence time. In theory this many independent samples could be averaged. The following considerations have to be taken account of, however.

The standard deviation $\rho_{\tau ave}$ is given by the equation:

$$\sigma_{\tau,ace} = \frac{\sigma_\tau}{\sqrt{M_s}} = \frac{2}{B\sqrt{M_s}} \quad (61)$$

where B is the bandwidth, $M_s$ is the number of samples being averaged and $\rho\tau=2/B$ is the sample time resolution. In order to reach an accuracy of 128 cm, as previously mentioned, a minimum of 550 samples would be required, which corresponds to 0.77 seconds, 5.8 km on the ocean surface or 38% of the pulse limited footprint.

Figure 17:
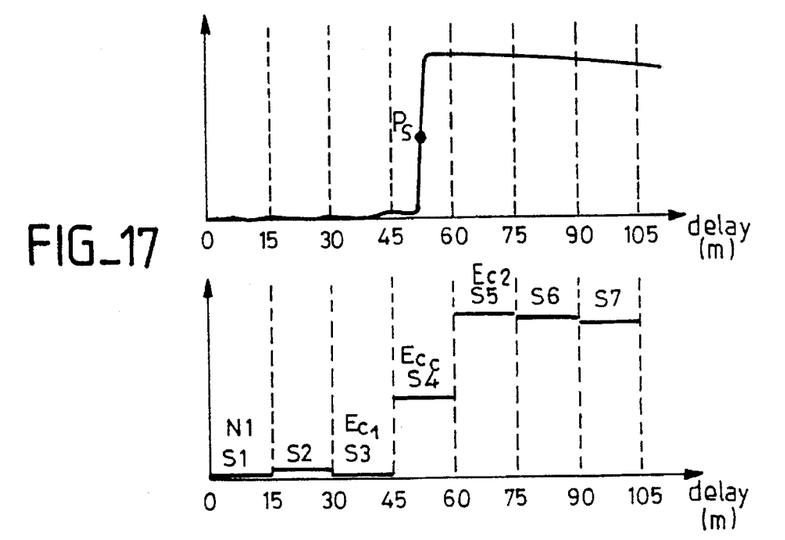
FIG. 17 is a diagram illustrating the operation of the device from FIG. 16.

FIG. 17 is a diagram in which the upper part shows the power received (reflected signal) as a function of the delay and the lower part shows the amplitude of the signals at the output of the detectors $4_1$ through $4_n$ also as a function of the delay. Knowing the propagation speed of radio waves, the delays can be expressed directly in units of length. The curve in the upper part of FIG. 17 is entirely analogous to the curve shown in FIG. 10c. The curve in the lower part has the advantage of being in the form of steps corresponding to the signals $S_1$ and $S_n$. It is therefore a simple matter to discriminate the mid-power center "step" from the other "steps" on either side of it: $S_1$ through $S_3$ "floor" steps and $S_5$ through $S_7$ "ceiling" steps. This determines the position of the point $P_S$ of specular reflection.

In addition to the circuits just described with reference to FIG. 16, in a preferred embodiment of the invention two main feedback loops are used. The first fixes the power difference between the noise affecting the lower part of the received signal and its linear upper part. The other maintains the received power at the same relative position to the time resolution cells.

The first loop is implemented using one sample $N_1$ of the header of the received signal which conveys very little of the wanted signal power, being mainly noise, and various samples $S_1$–$S_7$ distributed around the half-power point of the rising edge of the received signal. The second loop is implemented using the samples $Ec_1$ and $Ec_2$ around the central sample $Ec_C$ (half-power).

Figure 18:
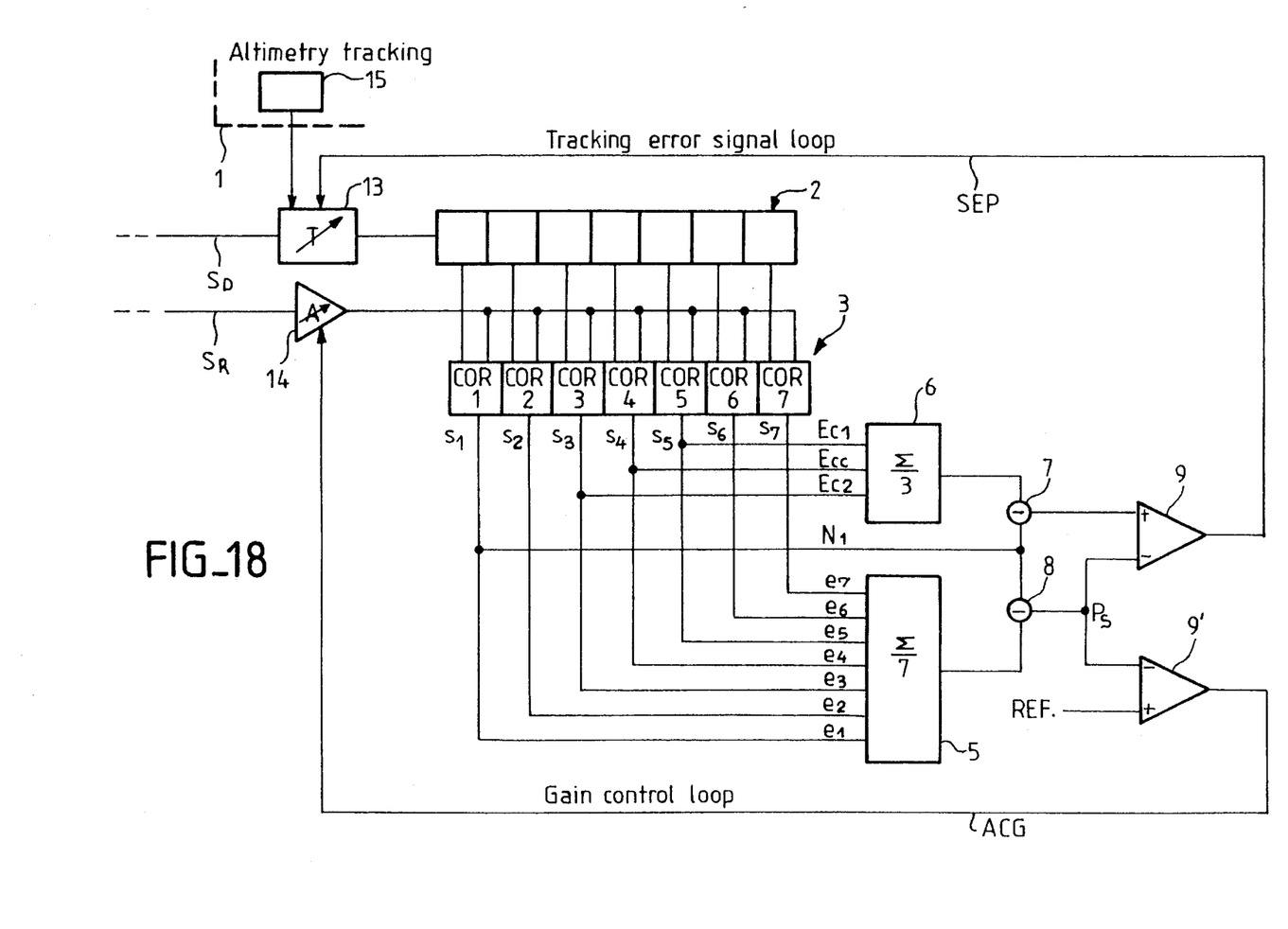
FIG. 18 shows specific details of the circuit from FIG. 16.

FIG. 18 illustrates this feature in more detail. The outputs $s_1$ through $s_7$ of the stages of the correlator bank 3 are connected to the inputs $e_1$ through $e_7$ of a first adder 5 which also applies weighting by 7. The outputs $s_3$ through $s_5$ are connected to the inputs of a second adder 6 forming the samples $E_1$, $E_C$ and $E_2$ previously mentioned. It also applies weighting by 3. The outputs of the adders 5 and 6 are connected to first inputs of two subtractors 7 and 8, respectively. These receive at a second input, forming the sample $N_1$ previously mentioned, the output signal $s_1$. As already mentioned, this signal consists essentially of the noise component. The output of the subtractor 8 represents the half power of the received signal. It is passed to the inverting inputs of respective operational amplifiers 9 and 9'. The non-inverting input of the operational amplifier 9' is connected to a constant reference signal. The AGC output signal of the amplifier 9' is a feedback signal for the first feedback loop and acts as an automatic gain control signal. The non-inverting input of the amplifier 9 is connected to the output of the subtractor 7. The output signal SEP, providing a tracking error signal, is passed to the second feedback loop.

The AGC signal controls a variable gain amplifier 14 operating on the reflected signal. The signal SEP introduces a variable delay into the direct signal by means of the variable delay circuit 13.

In addition to the two feedback loops the device includes conventional altimeter tracker circuits 15 implemented in the signal processor 1 which adjusts the delay to be applied (also by operating on the circuits 13, as already mentioned) to the direct signal before correlating it with the reflected signal so that the middle sample has the same mean power in the range between the noise and the flat upper part of the samples.

The delay adjustment constitutes the measurement of the mean sea level while the precision of the altimeter is given by the tracking error signal.

The measurements can be processed subsequently on board the platform in ways which are not within the scope of the invention.

The number of samples per signal naturally depends on the bandwidth of the system and also on the data rate of the instruments. To give a numerical, but non-limiting, example, and returning to the scenario as previously explained: "GPS" satellite transmitters and receiver R on board a low Earth orbit ("LEO") satellite, a wave can contain seven samples and the data rate is then 5,000 samples per second for the transmitter.

The invention is naturally not limited to the embodiments specifically described with reference to FIGS. 10a through 18 in particular. Specifically, altimetry is not restricted to maritime cartography (seas and oceans).

As mentioned, a plurality of different on board receivers can be used.

Also, specular reflection is not the only phenomenon which can be used. Diffuse reflection can be used in a similar way, in particular for altimetry of sea ice.

TABLE 1

APPENDIX 1
h = 700 km

| Elevation β (deg) | Arc length S (kg) | Distance R₂ (km) |
|---|---|---|
| 0 | 1551 | 1774 |
| 20 | 936 | 1209 |
| 40 | 557 | 913 |
| 60 | 299 | 768 |
| 80 | 95 | 707 |
| 90 | 0 | 700 |

TABLE 2 h = 10 km

| Elevation β (deg) | Arc length S (km) | Distance R₂ (km) |
|---|---|---|
| 0 | 204.8 | 205.2 |
| 20 | 26.9 | 28.7 |
| 40 | 11.8 | 15.5 |
| 60 | 5.7 | 11.5 |
| 80 | 1.7 | 10.1 |
| 90 | 0 | 10 |

TABLE 3 h = 1 km

| Elevation β (deg) | Arc length S (km) | Distance R₂ (km) |
|---|---|---|
| 0 | 65.052 | 65.064 |
| 20 | 2.746 | 2.923 |
| 40 | 1.197 | 1.56 |
| 60 | 0.577 | 1.155 |
| 80 | 0.182 | 1.016 |
| 90 | 0 | 1 |

TABLE 4

APPENDIX 2

| Parameter | C/A | P | Remarks |
|---|---|---|---|
| $P_eG_e$ | 28 dBw | 25 dBw | "GPS" minimum +3 dB |
| $R_e$ | $24 \times 10^6$ m | $24 \times 10^6$ m | |
| $\theta$ | 36 deg | 36 deg | Edge of swath |
| $K_B$ | $1.38 \times 10^{-23}$ W/kHz | $1.38 \times 10^{-23}$ W/kHz | |
| $T_a$ | 290 K | 290 K | |
| B | 2 MHz | 20 MHz | Radio frequency bandwidth |
| $\lambda$ | 0.19 m | 0.19 m | |
| F | 2 dB | 2 dB | |
| $\alpha$ | $27 \times 54$ m$^2$ | $8.5 \times 17$ m$^2$ | "GPS" elevation >40° |
| $G_r$ | 37 dB | 37 dB | $4 \times 4$ m antenna |
| $\Lambda$ | $43 \times 53$ km$^2$ | $43 \times 53$ km$^2$ | Edge of swath |
| $\sigma_0(0)$ | 12 dB | 12 dB | ERS-1 altimeter |
| $SNR_0$ | −9 dB | −32 dB | Single pulse |
| $R_2$ | 913 km | 913 km | Edge of swath |
| $\rho_\alpha$ | 27 km | 8.5 km | "GPS" elevation >40° |
| v | 7.5 km/s | 7.5 km/s | Satellite altitude: 700 km |
| $T_C$ | 428 μs | 1.36 ms | |
| N | 428 | 13 600 | |
| $SNR_N$ | 17.3 dB | 9.3 dB | N pulses |

TABLE 5

APPENDIX 3

| Elevation β | Arc length to | Pulse footprint length | |
|---|---|---|---|
| (degrees) | $P_S$ (km) | C/A (k/m) | P (km) |
| 0 | 1551 | | 42 |
| 10 | 1206 | | 32 |
| 20 | 936 | | 25 |
| 30 | 726 | | 20 |
| 40 | 557 | 54 | 17 |
| 50 | 418 | 46 | 15 |
| 60 | 299 | 42 | 13 |
| 70 | 193 | 39 | 12 |
| 80 | 95 | 37 | 12 |
| 90 | 0 | 36 | 11 |

TABLE 6

| Elevation (degrees) | Arc length to $P_S$ (km) | Vertical precision (cm) |
|---|---|---|
| 0 | 1551 | 231 |
| 10 | 1206 | 162 |
| 20 | 936 | 124 |
| 30 | 726 | 101 |
| 40 | 557 | 87 |
| 50 | 418 | 77 |
| 60 | 299 | 71 |
| 70 | 193 | 67 |
| 80 | 95 | 65 |
| 90 | 0 | 64 |

There is claimed:

1. An altimetry method using sources of opportunity with signals transmitted by at least one transmitter on board a platform in terrestrial orbit with particular characteristics; the method comprising; at least a stage of receiving and combining, in a receiver on board a platform in terrestrial orbit with particular specifications or on board an aircraft, signals received direct from the transmitter and signals reflected from the surface of the terrestrial sphere, and a stage of measuring the coordinates of the point of specular reflection of the signals transmitted from the surface of the terrestrial sphere by measuring the propagation delay of the reflected signals, a stage of comparing the theoretical model of the geometrical properties of the terrestrial surface relative to said model, and in which method said combination stage, to obtain the, echo waveform entails multiple correlation of the received reflected signal with a particular number of replicas delayed by a constant amount of the reflected signal, said waveform having an upstream noise floor and a downstream pulse of entirely reflected power amplitude bracketing a median range representing the delay associated with said point of specular reflection.

2. Method according to claim 1 wherein said source of opportunity transmits signals in the form of pseudo-random number sequences containing a limited number of pulses.

3. Method according to claim 2 wherein said source of opportunity is a transmitter on board satellites of the GPS satellite navigation system.

4. Method according to claim 1 wherein said receiver is on board a satellite in low Earth orbit.

5. Method according to claim 1 wherein the number of correlations is equal to seven.

6. Method according to claim 1 wherein said model is the World Geodetic System 1984 model.

7. Method according to claim 1 wherein said transmitter and said receiver are moving relative to each other and relative to the terrestrial sphere and further including a step of frequency shifting the direct signal to compensate the Doppler effect of the reflected signal.

8. Method according to claim 1 wherein a plurality of transmitters are used.

9. Method according to claim 1 wherein a plurality of receivers are used.

10. Method according to claim 1 applied to ocean altimetry.

11. Altimetry device for implementing the method according to claim 1 including at least first means controlling a variable delay unit to apply a first delay to the direct signal selected from a range of delays estimated relative to a prefined model, second means for generating a particular number of replicas of said direct signal, third means for carrying out multiple correlation of each of said replicas with the reflected signal and fourth means for detecting the output signals of said third means to obtain a series of signal samples offset in time equal in number to said predetermined number.

12. Device according to claim 11 wherein said first means comprise a signal processor.

13. Device according to claim 11 wherein said second means comprise a discrete delay line comprising a number of stages equal to said predetermined number, each stage delaying said direct signal by an identical amount.

14. Device according to claim 12 further including down converter means for reducing identically the frequency of the direct and reflected signals and means for frequency shifting the direct signals to compensate the Doppler effect of the reflected signals, said means being under the control of said signal processor.

15. Device according to claim 11 further including two feedback loops, the first using the first samples and distributed samples in said series and operating on variable gain means for amplifying the reflected signal and the second using the center sample and the two samples one on either side of it of said series of samples and operating on said variable delay unit.

* * * * *